(12) United States Patent
Aga et al.

(10) Patent No.: US 11,354,874 B2
(45) Date of Patent: Jun. 7, 2022

(54) INFORMATION PROCESSING APPARATUS AND INFORMATION PROCESSING METHOD

(71) Applicant: SONY CORPORATION, Tokyo (JP)

(72) Inventors: Hiroyuki Aga, Tokyo (JP); Atsushi Ishihara, Kanagawa (JP); Koichi Kawasaki, Tokyo (JP); Mitsuru Nishibe, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/979,950

(22) PCT Filed: Feb. 7, 2019

(86) PCT No.: PCT/JP2019/004447
§ 371 (c)(1),
(2) Date: Sep. 11, 2020

(87) PCT Pub. No.: WO2019/181263
PCT Pub. Date: Sep. 26, 2019

(65) Prior Publication Data
US 2021/0019955 A1  Jan. 21, 2021

(30) Foreign Application Priority Data
Mar. 20, 2018  (JP) .............................. JP2018-053209

(51) Int. Cl.
*G06T 19/20* (2011.01)
*G06T 7/73* (2017.01)
(Continued)

(52) U.S. Cl.
CPC .......... *G06T 19/20* (2013.01); *G02B 27/0025* (2013.01); *G02B 27/0172* (2013.01);
(Continued)

(58) Field of Classification Search
CPC ....... G06T 19/20; G06T 7/75; G02B 27/0025; G02B 27/0172; G06F 3/011
See application file for complete search history.

(56) References Cited

U.S. PATENT DOCUMENTS

| 6,793,350 B1* | 9/2004 | Raskar | G03B 37/04 |
| | | | 353/121 |
| 8,730,129 B2* | 5/2014 | Solomon | G02B 26/12 |
| | | | 345/8 |

(Continued)

FOREIGN PATENT DOCUMENTS

| CN | 106462370 A | 2/2017 |
| CN | 107430786 A | 12/2017 |

(Continued)

OTHER PUBLICATIONS

International Search Report and Written Opinion of PCT Application No. PCT/JP2019/004447, dated May 7, 2019, 07 pages of ISRWO.

*Primary Examiner* — Sarah Lhymn
(74) *Attorney, Agent, or Firm* — Chip Law Group

(57) ABSTRACT

Provided is an information processing apparatus, including a control unit that controls a display device to display a first image in a first display region and a second display region, respectively, which are adjacent to each other and have mutually different display timing, so that the first image is superimposed over a real space as seen by a user of the display device, and that controls the display device to transform the first image in the first display region and the first image in the second display region on the basis of changes in position posture information relating to the display device.

14 Claims, 14 Drawing Sheets

(51) Int. Cl.
*G02B 27/00* (2006.01)
*G02B 27/01* (2006.01)
*G06F 3/01* (2006.01)
*G06T 5/00* (2006.01)

(52) U.S. Cl.
CPC .............. *G06F 3/011* (2013.01); *G06T 5/006* (2013.01); *G06T 7/75* (2017.01); *G06T 2219/016* (2013.01)

(56) References Cited

U.S. PATENT DOCUMENTS

| | | | |
|---|---|---|---|
| 10,248,198 B1* | 4/2019 | Kim | G06F 3/012 |
| 2002/0126396 A1* | 9/2002 | Dolgoff | G09G 3/001 |
| | | | 359/743 |
| 2013/0100362 A1* | 4/2013 | Saeedi | G02B 5/30 |
| | | | 349/11 |
| 2015/0287167 A1* | 10/2015 | Cerny | G06T 1/60 |
| | | | 345/423 |
| 2015/0310665 A1 | 10/2015 | Michail et al. | |
| 2016/0364904 A1 | 12/2016 | Parker et al. | |
| 2018/0131926 A1* | 5/2018 | Shanks | H04N 13/344 |
| 2018/0188528 A1* | 7/2018 | Browy | G02B 3/04 |

FOREIGN PATENT DOCUMENTS

| | | |
|---|---|---|
| JP | 2016-024273 A | 2/2016 |
| JP | 2018-525693 A | 9/2018 |

* cited by examiner

FIG. 1A
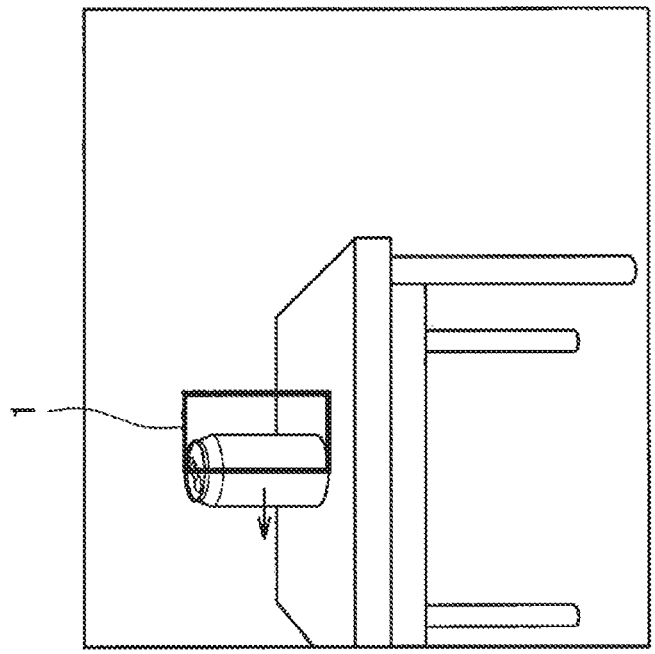
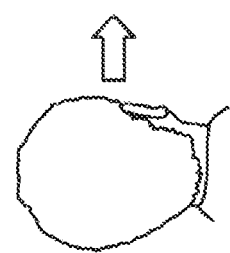
FIG. 1B
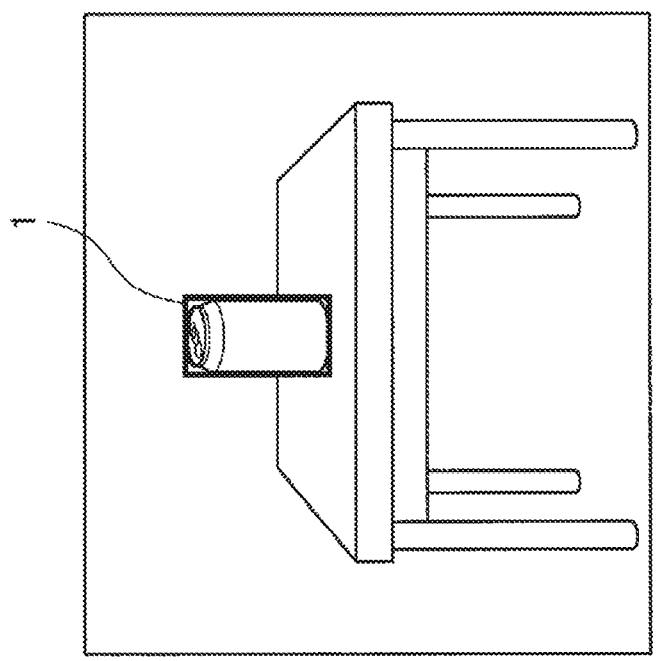
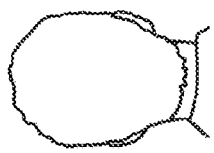

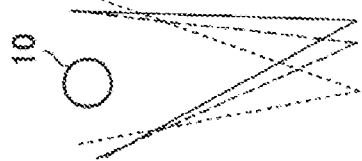  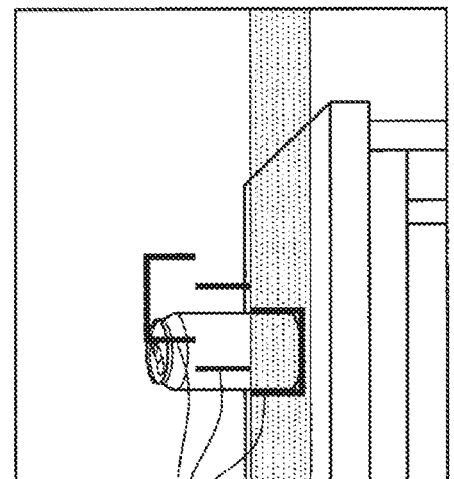
FIG. 4A
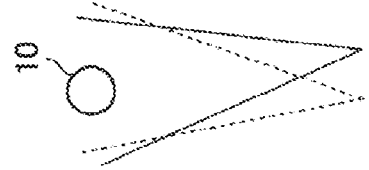  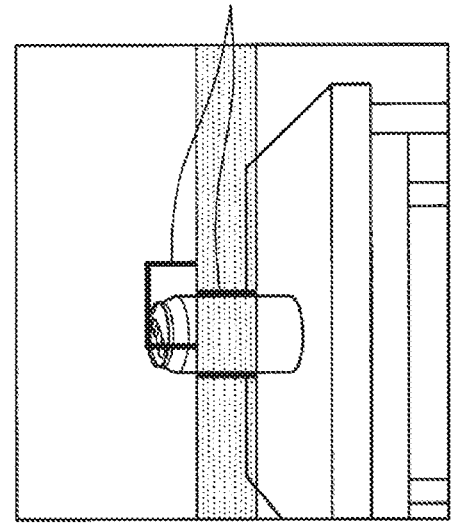
FIG. 4B
  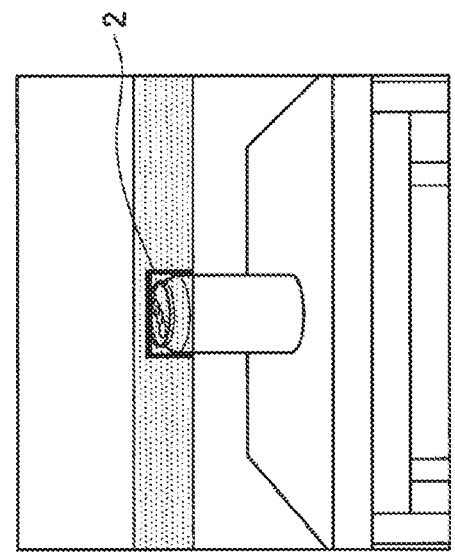
FIG. 4C

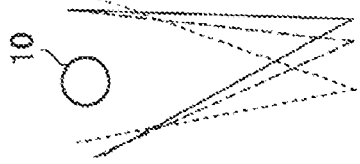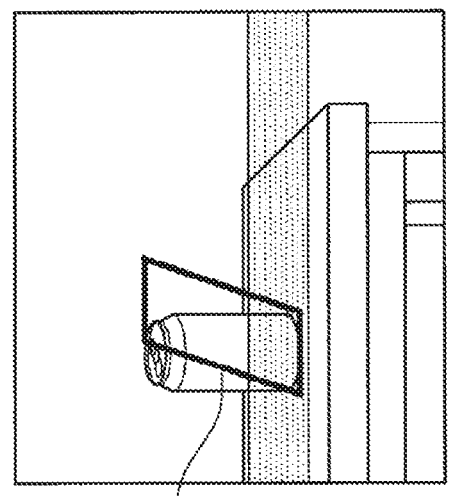
FIG. 5C
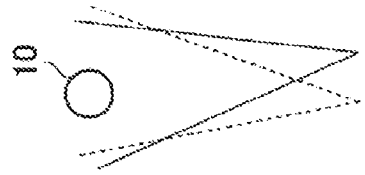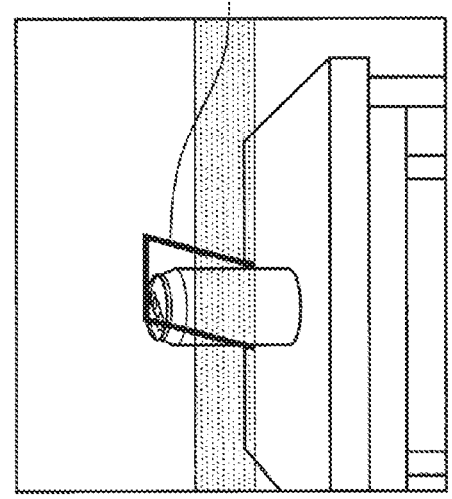
FIG. 5B
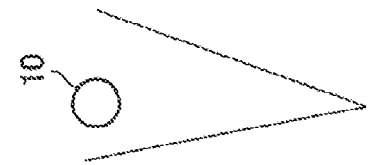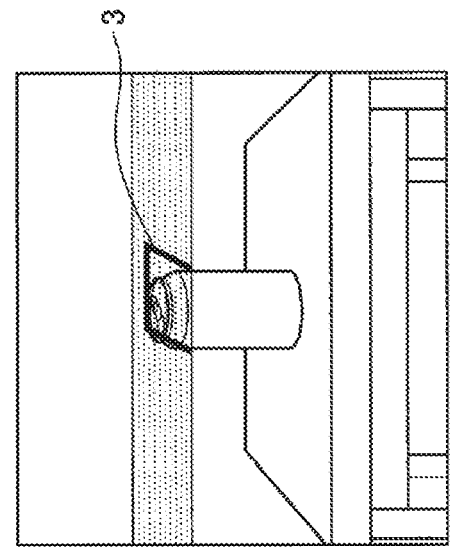
FIG. 5A

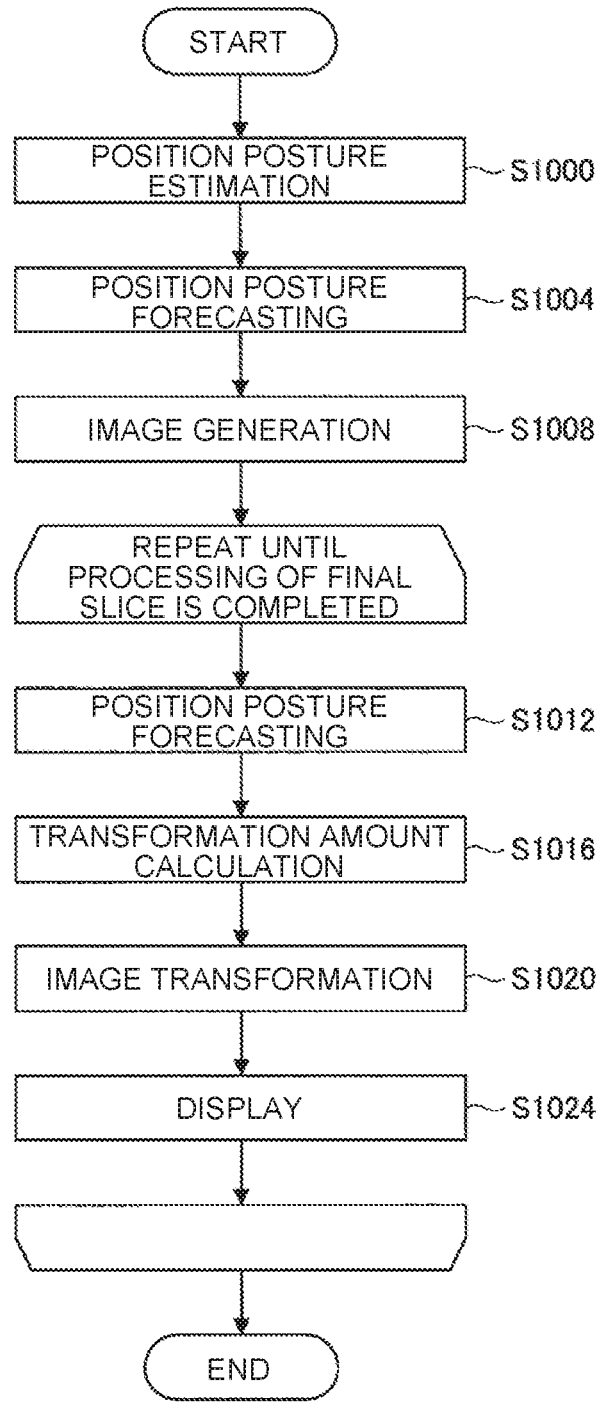

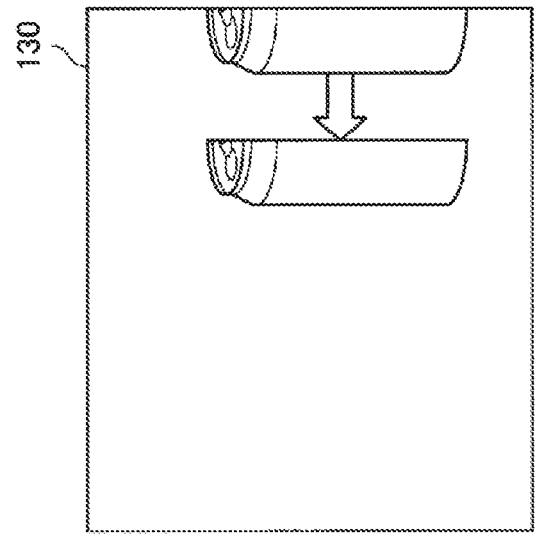
FIG. 10A
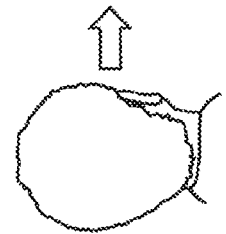
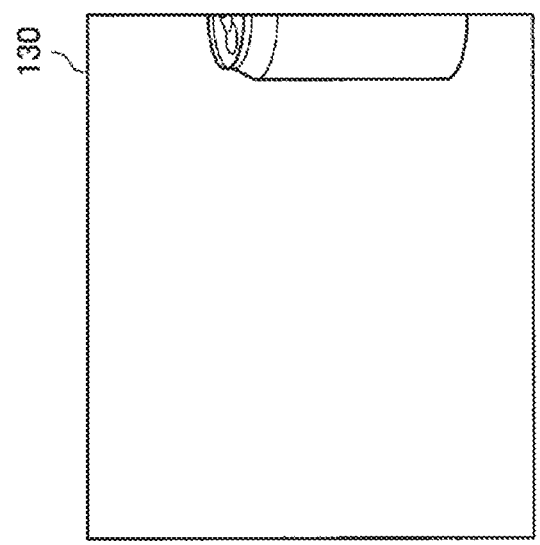
FIG. 10B

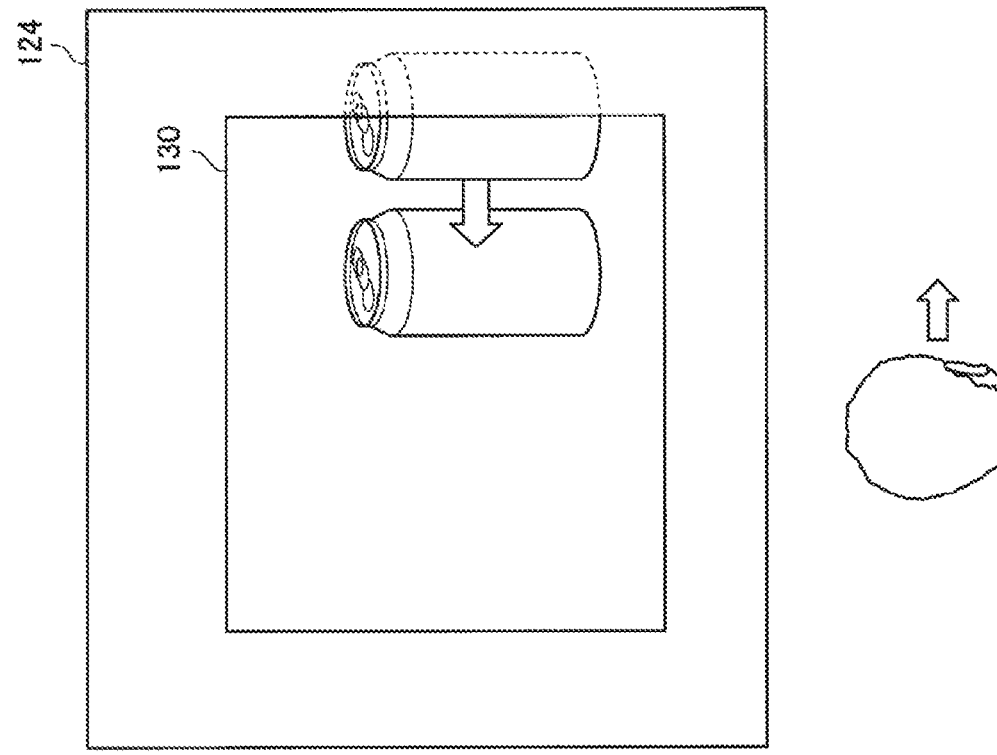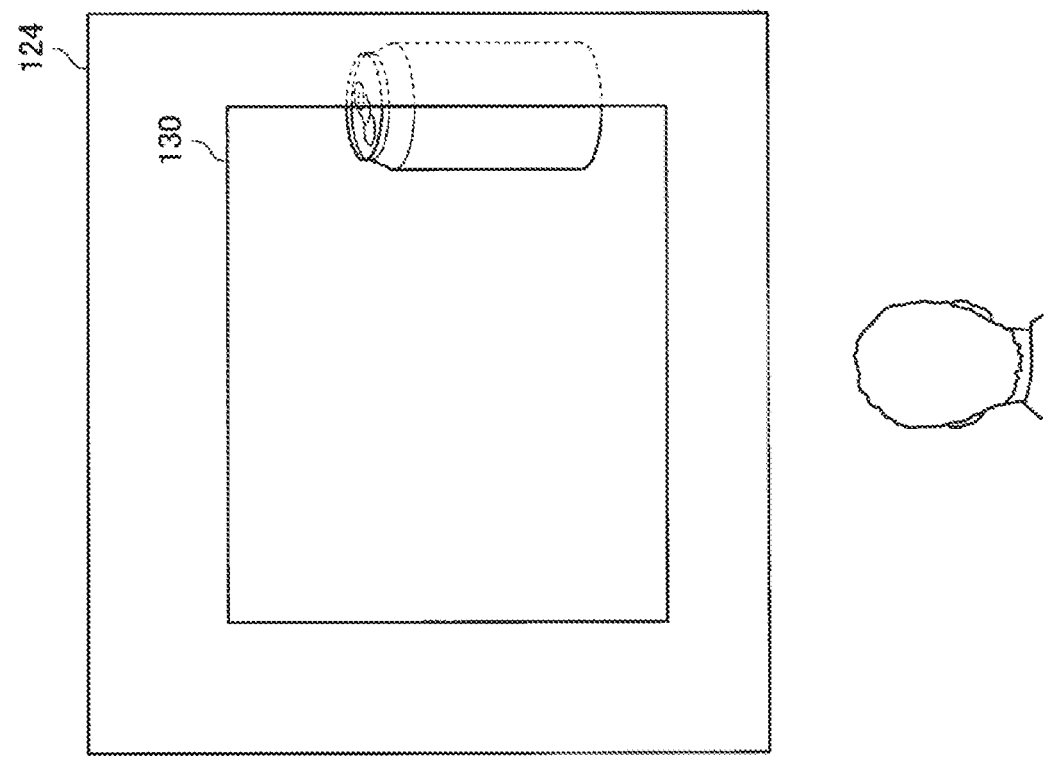

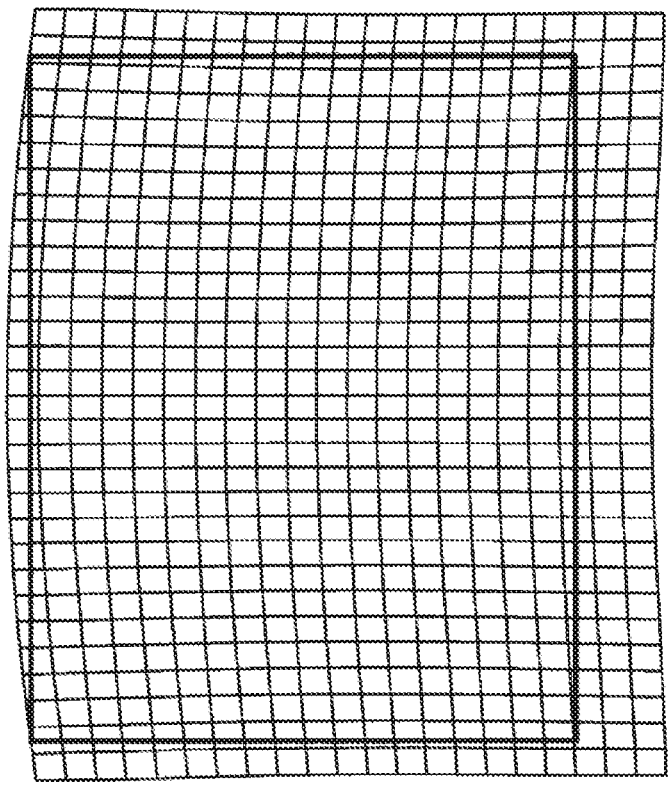
FIG. 12B
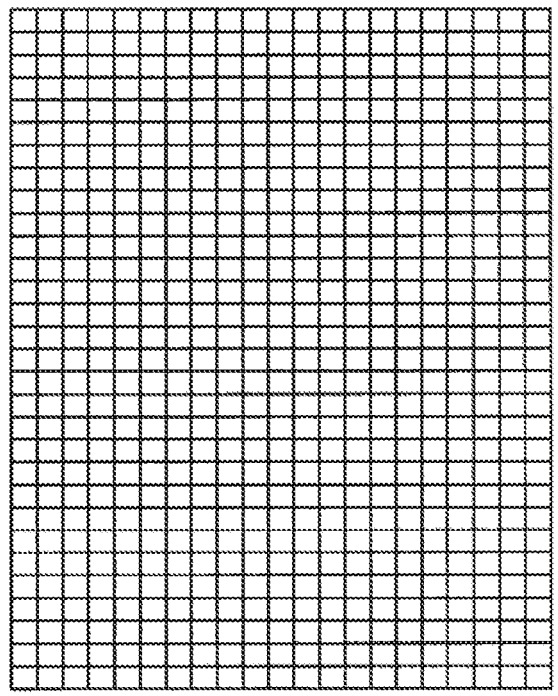
FIG. 12A

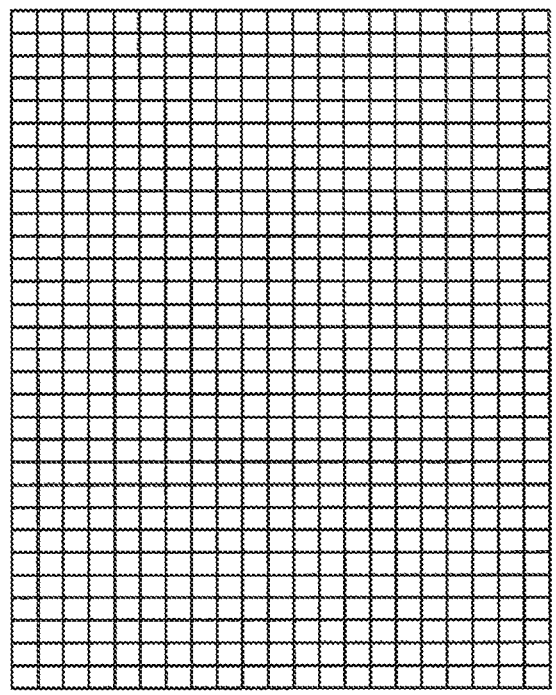
FIG. 13B
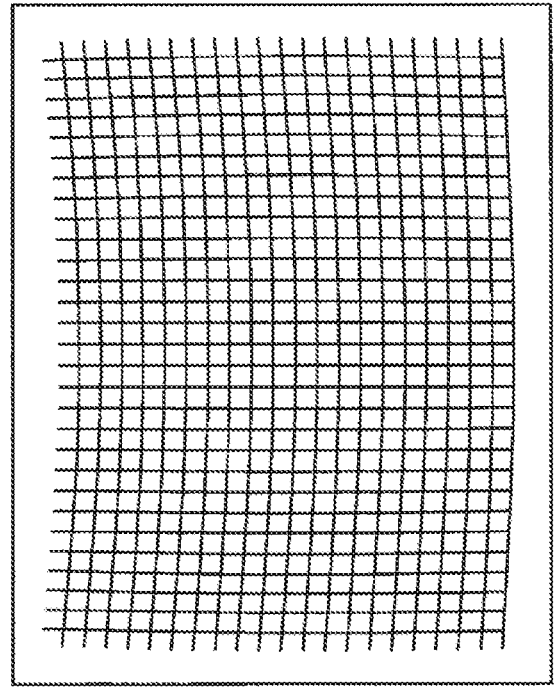
FIG. 13A

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/004447 filed on Feb. 7, 2019, which claims priority benefit of Japanese Patent Application No. JP 2018-053209 filed in the Japan Patent Office on Mar. 20, 2018. Each of the above-referenced applications is hereby incorporated herein by reference in its entirety.

FIELD

The present disclosure relates to an information processing apparatus, an information processing method, and a program.

BACKGROUND

In recent years, technology for displaying virtual images has been actively developed. For example, augmented reality (AR)-related technology has been actively developed. Accordingly, optically transmissive head-mounted displays (HMDs; referred to as "HMD" hereinbelow) have also been developed as devices for displaying an AR image which is superimposed over a real space.

Furthermore, Patent Literature 1 below discloses a technology for improving three-dimensionality of AR images so that AR images may be viewed harmoniously without discomfort with objects in a real space.

CITATION LIST

Patent Literature

Patent Literature 1: JP 2016-24273 A.

SUMMARY

Technical Problem

However, using the technology such as that of Patent Literature 1, AR images have sometimes not been suitably displayed. For example, there have been cases where, when a user wearing an HMD or an object in a real space moves, an AR image has been unable to track this movement, thereby producing a display delay and sometimes causing discomfort for the user.

Therefore, the present disclosure was conceived in view of the foregoing and provides a new and improved information processing apparatus, information processing method, and program that enable AR images to be displayed more suitably.

Solution to Problem

According to the present disclosure, an information processing apparatus is provided that includes: a control unit that controls a display device to display a first image in a first display region and a second display region, respectively, which are adjacent to each other and have mutually different display timing, so that the first image is superimposed over a real space as seen by a user of the display device, and that controls the display device to transform the first image in the first display region and the first image in the second display region on a basis of changes in position posture information relating to the display device.

Moreover, according to the present disclosure, an information processing method executed by a computer is provided that includes: controlling a display device to display a first image in a first display region and a second display region, respectively, which are adjacent to each other and have mutually different display timing, so that the first image is superimposed over a real space as seen by a user of the display device; and controlling the display device to transform the first image in the first display region and the first image in the second display region on a basis of changes in position posture information relating to the display device.

Moreover, according to the present disclosure, a program is provided that causes a computer to realize: controlling a display device to display a first image in a first display region and a second display region, respectively, which are adjacent to each other and have mutually different display timing, so that the first image is superimposed over a real space as seen by a user of the display device; and controlling the display device to transform the first image in the first display region and the first image in the second display region on a basis of changes in position posture information relating to the display device.

Advantageous Effects of Invention

According to the present disclosure as described hereinabove, it is possible to display AR images more suitably.

Note that the foregoing advantageous effects are not necessarily limited, rather, any advantageous effects disclosed in the present specification or other advantageous effects which can be ascertained from the present specification may be included in addition to the foregoing advantageous effects or instead of the foregoing advantageous effects.

BRIEF DESCRIPTION OF DRAWINGS

FIGS. 1A and 1B are diagrams to illustrate the background of the present disclosure.

FIGS. 4A, 4B, and 4C are diagrams illustrating an example of AR image display results according to a first embodiment.

FIGS. 5A, 5B, and 5C are diagrams illustrating an example of AR image display results according to a second embodiment.

FIG. 9 is a flowchart illustrating an example of operations of the information processing apparatus.

FIGS. 10A and 10B are diagrams illustrating an example of image loss caused by 2D position correction.

FIGS. 11A and 11B are diagrams illustrating handling of image loss caused by 2D position correction according to the modification example of the present disclosure.

FIGS. 12A and 12B are diagrams illustrating distortion correction.

FIGS. 13A and 13B are diagrams illustrating distortion correction.

DESCRIPTION OF EMBODIMENTS

Figure 2:
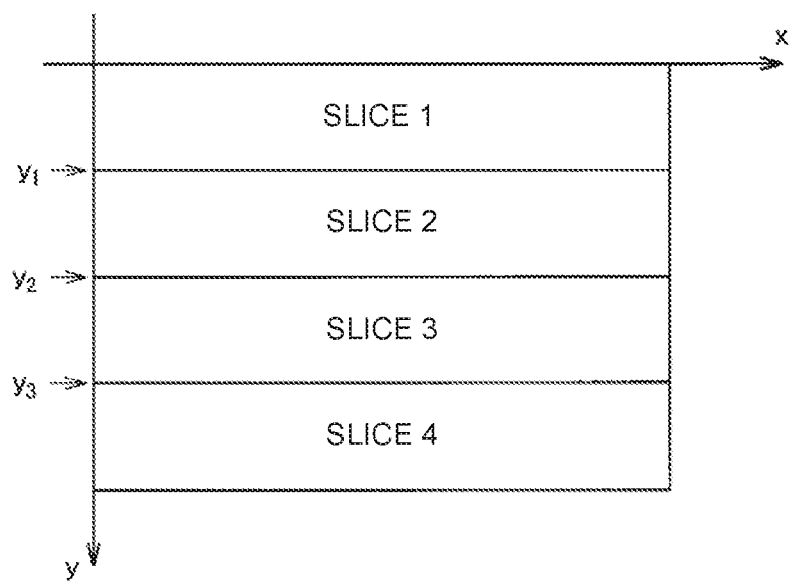
FIG. 2 is a diagram illustrating an example of slices provided in a display (display unit).

Preferred embodiments of the present disclosure will be described in detail hereinbelow with reference to the accompanying drawings. Note that repetitive descriptions are omitted from the present specification and drawings by assigning the same reference signs to constituent elements which have substantially the same function configurations.

Note that the description will be provided in the following order.
1. Background
2. Overview of the information processing apparatus according to the present disclosure
3. Function configuration
4. Operation
5. Modification example
6. Hardware configuration
7. Conclusion

1. BACKGROUND

First, the background of the present disclosure will be described.

As mentioned earlier, technology relating to augmented reality has been actively developed in recent years. Accordingly, devices such as optically transmissive HMDs have also been developed. Optically transmissive HMDs are devices that are capable of realizing multiple user experiences by displaying, in superimposed fashion, various AR images in a real space which the user is observing.

Furthermore, Patent Literature 1 above discloses a technology for improving three-dimensionality of AR images so that AR images may be viewed harmoniously without discomfort with objects in a real space.

However, using the technology such as that of Patent Literature 1, AR images have sometimes not been suitably displayed. For example, there have been cases where, when a user wearing an HMD or an object in a real space moves, an AR image has been unable to track this movement, thereby producing a display delay and sometimes causing discomfort for the user. Note that, in the present specification, a "display delay" may, for example, be regarded as corresponding to a time period that extends from a time point when it is determined that an AR image will be displayed in response to the HMD acquiring real space-related sensing data until a time point when the AR image is actually displayed by the HMD.

For example, as per FIG. 1A, the user is assumed to be observing a table and a can which are objects in a real space, and an AR image 1 which is superimposed over the can. Further, as per FIG. 1B, when the position of the can in view changes due to the user moving their head to the right, AR image 1 is unable to track this movement and is displayed temporarily displaced from the can, and therefore the user may experience discomfort upon recognizing this display delay. Furthermore, the more vigorous the movement of the user or the real space object is (when the movement speed is high, and so forth), the larger the displacement between the AR image 1 and the real space object is.

In particular, in a display for which a raster scanning system is used, because the timing of scanning varies according to the display position on the screen, the degree of display delay of the AR image is different in each display position. More specifically, as long as the AR image rendered in the frame buffer is not updated, the later the scanning timing of the display position is, the more significant the AR image display delay is.

On the other hand, when virtual reality (VR) images of VR technology are displayed by a shielded HMD that totally covers and shields the field of view of the user wearing the HMD, because everything appearing in the field of view is represented by the VR images, even when a raster scanning system is adopted for the display, displacement between VR images are not generated.

Here, for example, technologies such as TimeWarp or Reprojection exist that, in cases where a VR image is displaced relative to the position posture of the actual HMD due to a delay in generating the VR image, compensate for this displacement by transforming the VR image thus generated. Such technologies perform VR image transformation using a whole screen (a single frame unit) and are effective for devices in which the whole screen emits light in each color, as in the case of a color field sequential-system display which uses LCoS (registered trademark), for example. On the other hand, even when such technologies are applied to a raster scanning system device, the problem that the later the scanning timing of the display position is, the more significant the AR image display delay is, remains unresolved.

Thus, the present inventors hit upon the idea of developing the present technology in view of the foregoing issues. The details of the technology pertaining to the present disclosure will be described in sequence hereinbelow.

2. OVERVIEW OF THE INFORMATION PROCESSING APPARATUS ACCORDING TO THE PRESENT DISCLOSURE

2-1. First Embodiment

The background of the present disclosure has been described hereinabove. Next, an overview of an information processing apparatus 100 according to a first embodiment of the present disclosure will be described.

In the present specification, a case where the information processing apparatus 100 according to the present disclosure is an optically transmissive HMD of a raster scanning system will be described by way of an example. Note that this is merely an example, and the information processing apparatus 100 may be an optional device other than an optically transmissive HMD. Furthermore, the type and shape of the optically transmissive HMD used are optional. For example, the information processing apparatus 100 may be an HMD of the headband type (the type worn by using a band around the whole head. A band that passes not only the temporal regions but also the top of the head is sometimes also provided) or may be an HMD of the helmet type (the helmet visor part corresponds to the display).

The information processing apparatus 100 is provided with various sensors such as an outward-facing camera that, when worn, performs imaging in the direction of the line of sight of the user, that is, in an outward direction (an imaging device for performing environment recognition and/or object recognition), an inward-facing camera that, when worn, performs imaging of the eyes of the user, an acceleration sensor, a gyro sensor, or a microphone. Note that the sensors provided in the information processing apparatus 100 are not limited to these sensors. At least one of these sensors may be omitted and sensors other than the example sensors here may also be added, depending on the type of data to be detected, the required accuracy, and the device configuration. That is, the configuration of sensors may be suitably modified in cases where a non-HMD configuration (such as a mobile terminal which is used by being gripped by the user such as a smartphone, or an in-vehicle head-up display (HUD), or the like) is adopted as the device configuration.

The information processing apparatus 100, to which the raster scanning system is applied, comprises a display that has a plurality of adjacent display regions with different display timing. For example, FIG. 2 illustrates an example in which a display has been divided into four slices (display regions) in a direction perpendicular (a y-axis direction in the drawing) to the scanning direction (an x-axis direction in the drawing). That is, boundaries between slices are provided substantially parallel to the scanning direction of a raster scan. Display processing is executed sequentially in accordance with scanning in each of the slices. For example, in FIG. 2, display processing is performed in order starting with slice 1, where scanning is performed first, followed by slice 2, slice 3, and then slice 4. Note that the display method is merely an example and therefore may be suitably changed. Furthermore, the number of slices (the number of display partitions) and the size and shape of each slice are optional. For example, for the information processing apparatus 100, the number of slices and size and shape of each slice may be modified dynamically according to the processing performance of the apparatus itself or the residual battery capacity, the quality required, the application content, and the like. Note that either one of two mutually adjacent slices among the plurality of slices may be referred to as the first display region, while the other is referred to as the second display region. As mentioned earlier, the first display region and second display region may be regarded as having mutually different display timing.

The information processing apparatus 100 acquires an original image, which is to serve as a source for an AR image displayed in each slice, on the basis of position posture information of the information processing apparatus 100, for example (position posture information of an output device (display device), environment recognition results, and/or object recognition results. Note that, in the present specification, "AR images" may be regarded as images which are displayed so as to be superimposed over a real space as seen by a user. Data relating to an original image may be pre-stored in a storage device (described subsequently) or may be suitably acquired from a network via wireless communication. The information processing apparatus 100 generates, in the frame buffer, an original image which is to serve as a source for an AR image which is displayed in each slice and displays the AR image in each slice by performing image processing on the original image. At such time, the information processing apparatus 100 controls the image processing for each slice. More specifically, the information processing apparatus 100 controls the transformation amount of the original image in the frame buffer, for each slice. The transformation amount of the original image in each slice is sometimes a first transformation amount, a second transformation amount, . . . or an nth transformation amount. Note that the AR image displayed in each slice is also referred to as the first image, while the original image serving as the source of the AR image is also referred to as the second image. It should be noted that, in the present specification, "original image transformation (first image transformation)" may include "the movement amounts of a plurality of parts of the original image are differentiated from one another"), as illustrated in FIGS. 4A, 4B, and 4C.

Here, an overview of a series of operations in which the information processing apparatus 100 displays an AR image will be described with reference to FIG. 3. First, in the "sensing data acquisition" of FIG. 3, the information processing apparatus 100 acquires sensing data which is outputted by various sensors such as an outward-facing camera. In "position posture estimation", the information processing apparatus 100 estimates the position posture of the local device on the basis of the sensing data. In "position posture forecasting (for rendering)", the information processing apparatus 100 forecasts the position posture of the local device when displaying an AR image on the display on the basis of the estimated position posture of the local device. Note that, by analyzing an image captured by the outward-facing camera, or the like, the information processing apparatus 100 may forecast not only the position posture of the local device, but also the position posture and the like of an object in a real space which the user is observing. Note that, in the present specification, information items relating to the position posture may each be regarded as an example of position posture information.

In the "image generation", the information processing apparatus 100 generates, in the frame buffer, an original image on the basis of the position posture forecasting. In the "position posture forecasting (for transformation)", the position posture of the local device at the respective points in time at which the information processing apparatus 100 displays an AR image in each slice is forecast at a time point which is as immediately preceding as possible the time point when the display is generated in each slice. In a "transformation amount calculation", the information processing apparatus 100 calculates, for each slice, an original image transformation amount on the basis of a position posture forecasting result. In "image transformation", an AR image which is displayed in each slice is generated by performing transformation processing on the original image on the basis of the transformation amount calculated by the information processing apparatus 100. More specifically, in the "image transformation", the information processing apparatus 100 generates an original image (a second image) on the basis of position posture information of a time point $t_r$, and performs transformation processing on a plurality of original images which are obtained by slicing the generated original image on the basis of a plurality of position posture information items at a time point immediately preceding time points $t_{w1}$, $t_{w2}$ . . . $t_{wj}$. In "display light emission", the information processing apparatus 100 displays the AR images, which have undergone transformation processing, in each slice.

As mentioned earlier, at a time point which is as immediately preceding as possible the time point when the display is generated in each slice, the information processing apparatus 100 forecasts the position posture of the local device at the display time point of each slice, and by performing image transformation for each slice on the basis of the forecasting results, is capable of reducing the displacement in the superimposed position and the display delay which are experienced by the user. Furthermore, by making the cycle for generating an original image, which requires higher power consumption, smaller than the transformation processing cycle, the information processing apparatus 100 is capable of reducing the power consumption.

Here, an example of AR image display results according to the first embodiment will be described with reference to FIGS. 4A, 4B, and 4C. As illustrated in FIGS. 4A, 4B, and 4C, when the position of a user 20 has moved, the information processing apparatus 100 is capable of displaying an AR image 2 in each slice so as to track a can 10 in a real space. Thus, the information processing apparatus 100 is capable of reducing the displacement in the superimposed position and the display delay which are experienced by the user in comparison with the display result illustrated in FIG. 1B. This occurs because the human eye grasps the position of an AR image from a positional relationship with the real space seen in the background, and therefore, if the ability to track localized positional relationships on the screen is improved, the user is able to perform recognition so that the whole AR image is oriented precisely in real space. For example, in FIGS. 4A, 4B, and 4C, the user 20 is able to recognize that the whole AR image is oriented precisely in real space, on the basis of a lower position of the AR image 2 in which the same is installed on the table. In other words, it may be considered that the user recognizes the substantive position of the whole AR image on the basis of the part of the AR image which is close to (in contact with) the real object.

Note that, although a case where an AR image displayed in each slice is a rectangular image that highlights a real object (the can 10) in a real space and which is superimposed over the object in the real space has been described hereinabove, the present invention is not limited to such a case. For example, the AR image displayed in each slice may be an image representing a single object. For example, in FIGS. 4A 4B, and 4C, the AR image 2 is a single rectangular image that highlights the can 10, but may also be, instead of a rectangular image, an annotation image fixed to the top of the can 10 (an image illustrating additional information) or an image in which at least a portion of the information about the can 10 (text information such as a label of the can 10, or color information about the can 10, or the like) has been replaced. Note that a plurality of virtual objects, the positional relationships of which are relatively fixed, may be regarded as a "single object" in the present specification. For example, in a case where a character is displayed at the top of the can 10 as the AR image 2 in FIGS. 4A 4B, and 4C, a combination of the character itself and an object which is held by the character may be regarded as a "single object". Alternatively, a combination of the character itself and an annotation image that is fixed so as to float above the character itself may also be regarded as a "single object". In other words, a combination of a plurality of mutually separate virtual objects may also be regarded as a "single object". Note that some or all of an AR image may be an image which is displayed in a position where an object does not exist in a real space. In the present specification, the foregoing "single object" may be interpreted as being divided into a first display region and a second display region.

2-2. Second Embodiment

An overview of the information processing apparatus 100 pertaining to the first embodiment of the present disclosure has been provided hereinabove. Next, an overview of an information processing apparatus 100 according to a second embodiment of the present disclosure will be described.

In the first embodiment, when the original image transformation amount is different for each slice, a phenomenon (also called "tearing") arises where, as illustrated in FIGS. 4A, 4B, and 4C, an unnatural seam arises in the AR image at the boundary between the slices.

Therefore, the information processing apparatus 100 according to the second embodiment controls a plurality of original image transformation amounts (a first transformation amount, second transformation amount . . . ) which are obtained by slicing, on the basis of position posture information at mutually different time points in the image transformation of each slice, thereby (at least partially) maintaining the positional relationships between the plurality of original images and substantially maintaining the continuity of the original images. More specifically, transformation amounts are given continuous values within slices and the transformation amounts of each of the slices are substantially the same at the boundaries between adjacent slices. Thus, the information processing apparatus 100 according to the second embodiment is capable of preventing tearing from occurring (or reduces the effect of tearing).

Here, an example of AR image display results according to the second embodiment will be described with reference to FIGS. 5A, 5B, and 5C. As illustrated in FIGS. 5A, 5B, and 5C, when the position of the user 20 has moved, the information processing apparatus 100 is capable of displaying an AR image 3 so as to track a can 10 in a real space and of preventing tearing. Thus, in comparison with the first embodiment illustrated in FIGS. 4A, 4B, and 4C, the information processing apparatus 100 according to the second embodiment is capable of further reducing the displacement in the superimposed position and the display delay which are experienced by the user, and is capable of reducing flicker in the AR image caused by tearing.

3. FUNCTION CONFIGURATION

An overview of the information processing apparatus 100 according to the first and second embodiments of the present disclosure has been provided hereinabove. Next, a function configuration of the information processing apparatus 100 will be described with reference to FIG. 6. Note that the description hereinbelow makes no particular mention of points common to the first and second embodiments, instead mentioning differences between the first and second embodiments.

Figure 6:
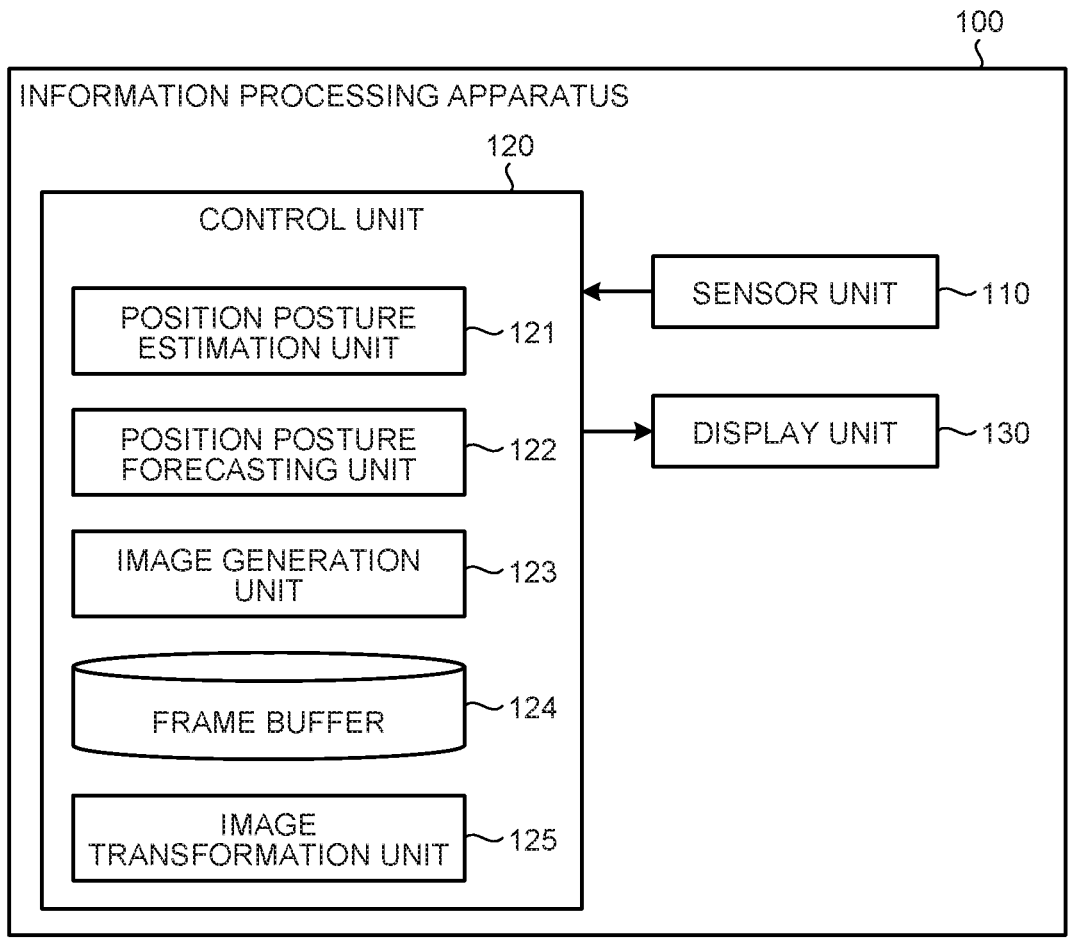
FIG. 6 is a block diagram illustrating an example of a function configuration of an information processing apparatus.

As illustrated in FIG. 6, the information processing apparatus 100 comprises a sensor unit 110, a control unit 120, and a display unit 130. Furthermore, the control unit 120 comprises a position posture estimation unit 121, a position posture forecasting unit 122, an image generation unit 123, a frame buffer 124, and an image transformation unit 125.

(Sensor Unit 110)

The sensor unit 110 comprises various sensors that acquire various information relating to the user and the peripheral environment of the user. For example, the sensor unit 110 may comprise, other than the outward-facing camera, inward-facing camera, acceleration sensor, gyro sensor, microphone, as mentioned earlier, any kind of sensors as long as such sensors are capable of tracking physical changes and chemical changes, and so forth, that arise from a person's movements, such as a positioning sensor, a geomagnetic sensor, an atmospheric pressure sensor, a temperature sensor, a vibration sensor, a speech sensor, a heart rate sensor, a pulse wave sensor, a proximity sensor, an illuminance sensor, a pressure sensor, a perspiration sensor, a pH sensor, a humidity sensor, an infrared sensor, and the like. The sensor unit 110 supplies the sensing data generated by the various sensors to the control unit 120.

(Control Unit 120)

The control unit 120 centrally controls the various processing of the information processing apparatus 100. In particular, the control unit 120 according to this embodiment controls image transformation processing and the like for each slice. The respective function configurations which the control unit 120 comprises will be described subsequently.

(Position Posture Estimation Unit 121)

The position posture estimation unit 121 estimates the position posture and so forth of the information processing apparatus 100. More specifically, the position posture estimation unit 121 generates a depth map on the basis of the sensing data of the outward-facing camera and the like, which has been supplied by the sensor unit 110, implements Visual simultaneous localization and mapping (SLAM), and uses Visual SLAM to calculate the position posture, speed, and inertial acceleration, and so forth, of the local device. Further, by using the calculated position posture, speed, and so forth as original values, the position posture estimation unit 121 estimates, with a high degree of accuracy, the latest position posture, speed, and angular velocity of the local device by performing various processing relating to inertial navigation that uses an acceleration and an angular velocity which are obtained from an acceleration sensor and a gyro sensor (or an inertial measurement unit (IMU) that comprises these sensors). Note that the foregoing estimation method is merely an example and may be suitably modified. The position posture estimation unit 121 supplies the estimation results for the position posture and so forth of the local device to the position posture forecasting unit 122.

(Position Posture Forecasting Unit 122)

Figure 3:
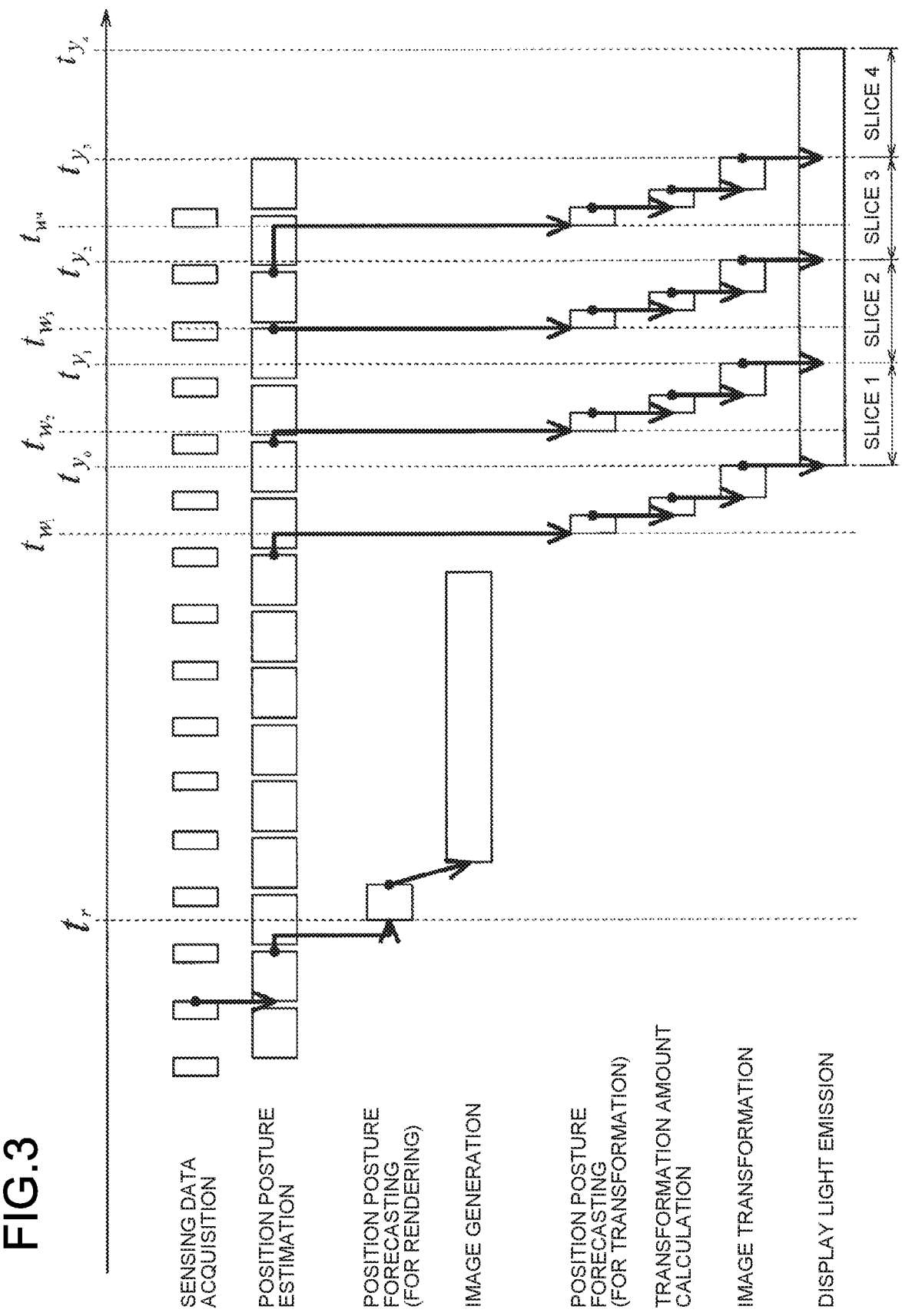
FIG. 3 is a diagram providing an overview of a series of operations in which an information processing apparatus displays an AR image.

The position posture forecasting unit 122 functions as a forecasting unit that forecasts the position posture and so forth of an object in a real space which the information processing apparatus 100 or the user is observing at a certain time point in the future, and implements the "position posture forecasting (for rendering)" and the "position posture forecasting (for transformation)" in FIG. 3. For example, the position posture forecasting unit 122 forecasts the position posture and so forth of the local device at a certain time point in the future by using a method such as linear interpolation, on the basis of the estimation results for the position posture and so forth of the local device in the past, which have been supplied by the position posture estimation unit 121. Furthermore, the position posture forecasting unit 122 forecasts the position posture and so forth at a certain time point in the future of an object in a real space which the user is observing by means of analysis, and so forth, of captured images which have been captured by the outward-facing camera. Note that the foregoing forecasting method is merely an example and may be suitably modified. The position posture forecasting unit 122 supplies the forecasting results to the image generation unit 123 or the image transformation unit 125.

(Image Generation Unit 123)

The image generation unit 123 functions as a generation unit that generates, in the frame buffer 124, an original image that is to serve as a source for an AR image which is displayed on the display. More specifically, the image generation unit 123 generates an original image on the basis of the forecasting results and application content which are supplied by the position posture forecasting unit 122. For example, the image generation unit 123 determines, on the basis of the foregoing information items, the content, size, angle, and surface treatment (reflection of light, or the like) of an original image and generates an original image that reflects this content. Note that the timing and frequency with which the image generation unit 123 generates an original image are optional. Furthermore, it is assumed in the description that the image generation unit 123 generates one screen's worth of an original image, but the present disclosure is not limited to such generation. For example, the image generation unit 123 may generate an original image equivalent to a few slices rather than one screen's worth or may generate an original image for each slice. Conversely, even in cases where an original image equivalent to a few slices is generated or an original image is generated for each slice, transformation processing may be performed in the same way as in cases where one screen's worth of an original image is generated.

(Frame Buffer 124)

The frame buffer 124 is a storage region that temporarily stores an original image which has been generated by the image generation unit 123. The frame buffer 124 may store one screen's worth of an original image, may store a plurality of screens' worth of original images, or may store original images in slice units.

(Image Transformation Unit 125)

The image transformation unit 125 performs original image transformation processing for each slice.

First, describing the first embodiment in specific terms, the image transformation unit 125 performs image transformation processing on the basis of the forecasting results for position posture and so forth at display start time points for the respective slices, and application content. Note that the image transformation unit 125 is not limited to display start time points for the respective slices and may perform image processing on the basis of forecasting results for position posture and so forth at any time point in a display period of each slice or at a display end time point of each slice, for example.

Next, describing the second embodiment in specific terms, the image transformation unit 125 performs image processing on the basis of the forecasting results for the display start time points and display end time points of the respective slices. More specifically, the image transformation unit 125 determines, for the slice which is displayed first among the slices (slice 1 in FIG. 2, for example), the respective original image transformation amount on the basis of a forecasting result for a display start time point and a forecasting result for a display end time point. Further, the image transformation unit 125 determines, for the subsequent slices (slices 2 to 4 in FIG. 2, for example) the transformation amounts of the slices on the basis of the forecasting results for the display end time point, and adopts the transformation amount at the display end time point of the preceding slice for the transformation amount at the display start time point. Thus, the image transformation unit 125 is capable of calculating the respective transformation amounts at the display start time point and the display end time point for each slice. In addition, the image transformation unit 125 uses the transformation amounts at the display start time point and the display end time point to continuously interpolate transformation amounts therebetween (in the slice display period). Note that the transformation processing according to the second embodiment will be described in more detail in "4. Operation".

Here the original image transformation processing by the image transformation unit 125 is broadly divided into "transformation amount calculation" and "image transformation" based on the calculation result.

The "transformation amount calculation" method is optional. For example, the transformation amount may be calculated from displacement in the gaze point of the user. More specifically, as the position posture and so forth of the local device changes, the image transformation unit 125 may calculate how one point (the gaze point) in a space which the user is focusing on has been displaced on the display (the display unit 130), and may calculate the transformation amount by applying this displacement amount to a warping mesh. Note that the gaze point denotes the point closest to the user among points of intersection between the direction of the line of sight of the user, an AR image, and an object in a real space.

The transformation amount may also be calculated from displacement of a gaze plane. More specifically, as the position posture and so forth of the local device changes, the image transformation unit 125 may calculate how three points (a gaze plane) in a space which the user is focusing on have been displaced on the display, and may calculate the transformation amount by applying this displacement amount to a warping mesh. Here, possible gaze plane selection methods include, for example, a method or the like in which, among polygons constituting an AR image, a polygon which is closest to the user among the polygons intersecting the direction of the line of sight of the user is used as the gaze plane, and in which method a predetermined application designates the gaze plane. Note that the "transformation amount calculation" method is not limited to the foregoing method.

Figure 7:
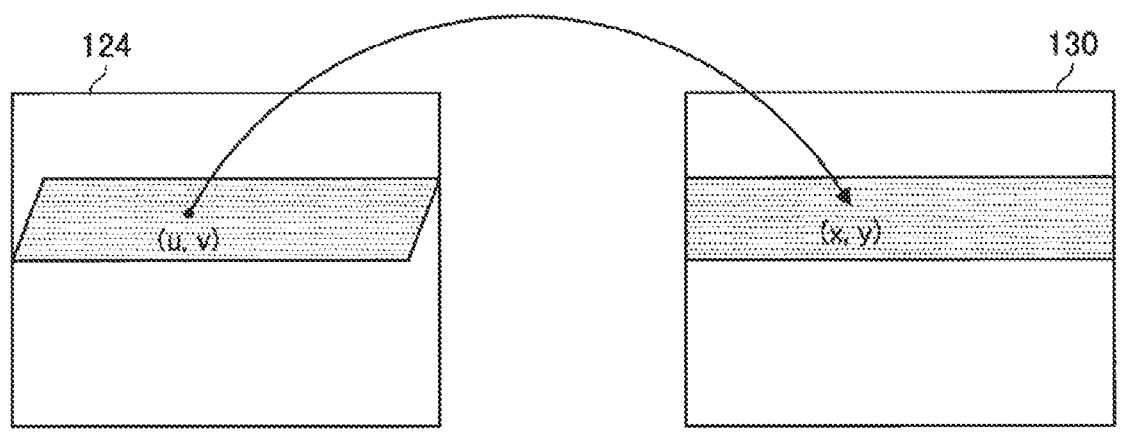
FIG. 7 is a diagram illustrating transformation of an original image.
Figure 8:
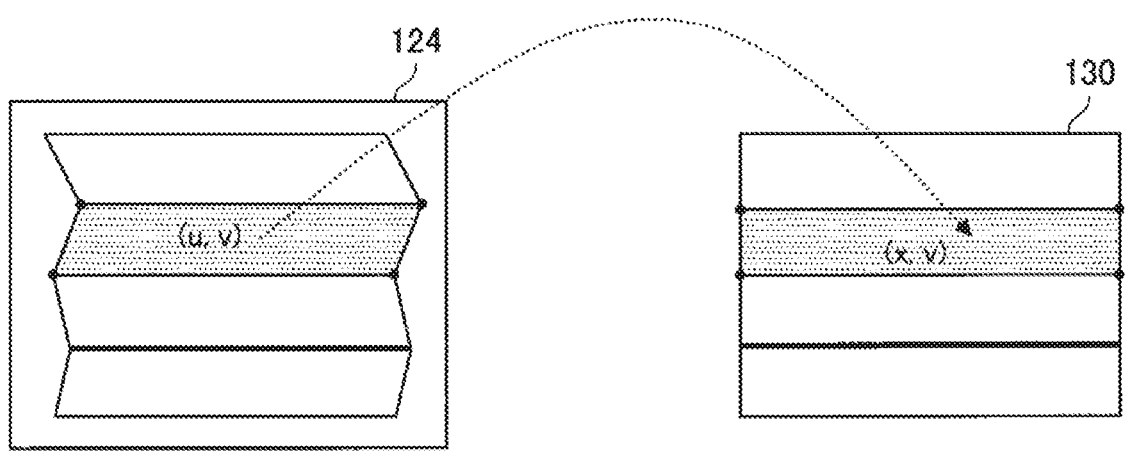
FIG. 8 is a diagram illustrating transformation of an original image according to a second embodiment.

Note that the transformation amount is defined as a photograph W from a point (x, y) in a coordinate system of a display (the display unit 130) to a point (u, v) in a coordinate system of the frame buffer 124, as illustrated in FIG. 7. In other words, the transformation amount is represented by a correspondence relationship between respective points on the display unit 130 and respective points on the frame buffer 124. In the second embodiment in particular, because the transformation amount of each slice at the boundary between adjacent slices is substantially the same, the transformation amount in each frame is a continuous value, as illustrated in FIG. 8.

Meanwhile, the "image transformation" method is also optional. For example, the image transformation unit 125 may perform image transformation by using partitioned affine warping. Partitioned affine warping is a method that is generally used in image transformation and distortion correction and which designates an image transformation amount by displacing mesh vertices. Because a case where the shape of the slices is a rectangle is described by way of an example in the present disclosure, the shape of the transformed image needs to be a rectangle. Therefore, the image transformation unit 125 basically performs transformation, using partitioned affine warping, on the original image before reading.

In addition, the image transformation unit 125 may perform image transformation by using raster scrolling. Raster scrolling is a function (also called "2D position correction" hereinbelow) that enables, upon reading the frame buffer, the reading position of each raster to be modified in a left-right direction. Image warping of a specified shape may be realized using raster scrolling.

(Display Unit 130)

The display unit 130 is a display that sequentially lights pixels using a raster scanning system and is a function configuration that displays AR images which have been subjected to transformation processing by the image transformation unit 125. The display unit 130 is thus capable of displaying an AR image superimposed over a real space. The display unit 130 is realized by a lens unit, a liquid crystal display (LCD) device, an organic light emitting diode (OLED) device, or the like, performing display by using hologram optics technology, for example. Furthermore, although the display unit 130 is assumed to be a transparent or semitransparent member, the present disclosure is not limited to such a member.

4. OPERATION

The function configuration of the information processing apparatus 100 has been described hereinabove. Next, the operation of the information processing apparatus 100 will be described with reference to FIG. 9. FIG. 9 is a flowchart illustrating the operation of the information processing apparatus 100 according to the second embodiment. The operation of the information processing apparatus 100 according to the first embodiment corresponds to the operation of the information processing apparatus 100 according to the second embodiment a part of which is omitted. The details will be described subsequently.

Note that FIGS. 2 and 3 are also suitably referenced. More specifically, as illustrated in FIG. 2, the y coordinate of the boundary between a jth slice and a j+1th slice is $y_j$, and as illustrated in FIG. 3, the start time for the position posture forecasting (for rendering) is $t_r$, the start time for position posture forecasting (for transformation) that corresponds to the jth slice is $t_{wj}$, and the display start time of the jth slice is $t_{yj-1}$.

In step S1000, the position posture estimation unit 121 estimates the latest position posture of the local device (including the speed and angular velocity, and so forth) on the basis of sensing data which has been supplied by the sensor unit 110 (captured images supplied by the outward-facing camera, and the like).

In step S1004, the position posture forecasting unit 122 forecasts the position posture and so forth of the local device to generate an original image. More specifically, the position posture forecasting unit 122 receives, as an input, a state variable $S(t_r)$ at a start time $t_r$ for position posture forecasting (for rendering) and outputs a function $P_{tr}(t)$ as the position posture of the local device at a certain future time t.

In step S1008, the image generation unit 123 generates an original image on the basis of the forecasting result. More specifically, the image generation unit 123 determines the viewpoint position of the user which is to be used in the generation of an original image, on the basis of the position posture forecasting $P_{tr}(t)$ and generates the original image in the frame buffer.

In step S1012, the position posture forecasting unit 122 forecasts the position posture and so forth of the local device for the transformation processing. More specifically, the position posture forecasting unit 122 receives, as an input, a state variable $S(t_{wj})$ at a start time $t_{wj}$ for position posture forecasting (for transformation) that corresponds to the jth slice and outputs a function $P_{twj}(t)$ as the position posture of the local device at a certain future time t.

In step S1016, the image transformation unit 125 calculates an original image transformation amount for each slice. More specifically, the image transformation unit 125 calculates the original image transformation amount by using position posture forecasting $P_{twj}(t)$.

The position posture forecasting $P_{yj}$ of the local device at a display start time $t_{yj-1}$ (j=1, ... N) of the jth slice is defined as per Equations 1 and 2 hereinbelow.

$$P_{y1} = P_{rw1}(t_{y0}) \quad \text{... (when } j=1\text{)} \quad (1)$$

$$P_{yj} = P_{rwj}(t_{yj-1}) \quad \text{... (when } j\text{=numerical value other than 1)} \quad (2)$$

Further, the position posture forecasting $P_r$ of the local device which is used to generate an original image=$P_{tr}(t_{y0})$, and the transformation amount for transforming an original image which has been generated on the basis of the position posture forecasting $P_r$ into an image based on the position posture forecasting $P_{yj}$ is written as $R_j$.

Further, the image transformation unit 125 performs interpolation (linear interpolation, for example) between a transformation amount $R_{j-1}$ at the display start time of the jth slice (the upper display time of the jth slice) and a transformation amount $R_j$ at the display end time (the lower display time of the jth slice and the upper display time of the j+1th slice) (that is, times during the display period of the jth slice), thereby calculating the final transformation amount $W_j$ as per Equation 3 hereinbelow.

$$W_j = k \cdot R_j + (1-k) \cdot R_{j-1} \quad (3)$$

Interpolation coefficient k in Equation 3 is determined on the basis of the y coordinate in the slice. That is, the image transformation unit 125 is capable of realizing continuous transformation in a slice by using Equation 4 hereinbelow to calculate interpolation coefficient k in the jth slice, and continuity at the seams between slices.

$$k = \frac{y - y_{j-1}}{y_j - y_{j-1}} \quad (4)$$

In step S1020, the image transformation unit 125 transforms an original image on the basis of the calculated transformation amount. More specifically, the image transformation unit 125 performs transformation processing using partitioned affine warping, raster scrolling, or the like, on the basis of the calculated transformation amount.

In step S1024, the display unit 130 displays an AR image after transformation of each slice.

Note that the processing of steps S1012 to S1024 is repeated according to the number of slices which the display unit 130 has.

By means of the operations of the respective function configurations described hereinabove, the information processing apparatus 100 is capable of displaying a more appropriate AR image for each slice. Note that, as mentioned earlier, FIG. 9 illustrates the operation of the information processing apparatus 100 according to the second embodiment. However, when the operation of the information processing apparatus 100 according to the first embodiment is described, the image transformation unit 125 performs, in step S1016 above, transformation processing without performing interpolation (linear interpolation, for example) between a transformation amount $R_{j-1}$ at the display start time of the jth slice (the upper display time of the jth slice) and a transformation amount $R_j$ at the display end time (the lower display time of the jth slice and the upper display time of the j+1th slice) (that is, times during the display period of the jth slice). Thus, although tearing occurs in the first embodiment, the processing load of the first embodiment is reduced in comparison with the processing load of the second embodiment.

5. MODIFICATION EXAMPLE

The operation of the information processing apparatus 100 according to the second embodiment has been described hereinabove. Next, modification examples of the present disclosure will be described.

(5-1. Handling of Image Loss Caused by 2D Position Correction)

First, a function for preventing image loss in a case where 2D position correction has been performed on an original image will be described.

For example, as illustrated in FIG. 10A, an original image of the left half of a can is generated in the frame buffer, and an AR image of the left half of the can is assumed to be displayed on the right edge of the display as a result of the foregoing original image being mirrored by the display. Thereafter, as illustrated in FIG. 10B, when the user moves their head to the right, an AR image of the can is displayed on the display as moving to the left as a result of performing 2D position correction on the original image. At such time, unless the original image in the frame buffer is re-rendered, only an AR image of the left half of the can is displayed, and an AR image of the right half of the can is lost.

Therefore, the information processing apparatus 100 according to this modification example handles the foregoing phenomenon. More specifically, the information processing apparatus 100 according to the modification example secures a wider surface area in the frame buffer 124 than for the display (the whole display region) constituting the display unit 130. Thus, the information processing apparatus 100 is capable of preventing part of an AR image being lost when 2D position correction is performed.

More specifically, as illustrated in FIGS. 11A and 11B, when a wider surface area in the frame buffer 124 than for the display unit 130 is secured, the image generation unit 123 is capable of generating, in the frame buffer 124, not only an original image of the left half of the can but also an original image of the right half of the can which is not displayed by the display unit 130. Hence, even in a case where an AR image of the can is displayed as moving to the left as per FIG. 11B as a result of 2D position correction being performed on the original image, the display unit 130 is capable of suitably displaying an AR image of the right half of the can.

Note that the size of the surface area of the frame buffer 124 is optional. For example, the surface area of the frame buffer 124 may be determined on the basis of the size of the AR image which is dependent on application content, or the like. Furthermore, the surface area of the frame buffer 124 may be determined according to the required quality or processing speed and, conversely, in cases where image loss is permitted or where an image display of a higher speed is required, the surface area of the frame buffer 124 may be configured to be small. In addition, the surface area of the frame buffer 124 may be determined according to the residual battery capacity, and when the residual battery capacity is smaller than a predetermined value, the surface area of the frame buffer 124 may be configured to be small.

Note that the present modification example may also be applied to either of the foregoing first and second embodiments.

(5-2. Longitudinal Delay Compensation)

It is difficult for an information processing apparatus 100 of a raster scanning system to track changes in movement in a longitudinal direction (a direction perpendicular to the scanning direction) in comparison with changes in movement in a lateral direction (the scanning direction). The information processing apparatus 100 according to this modification example is capable of suitably tracking changes in movement in the longitudinal direction by performing longitudinal delay compensation in the course of performing distortion correction.

Here, an overview of distortion correction will be described. The display surface of a display provided in a device such as an HMD often has a curved shape rather than a planar shape. In cases where the display surface of the display has a curved shape, when an image that has been rendered as planar is displayed on the display, the image appears to the user to be distorted. For example, when an image that has been rendered as planar as per FIG. 12A is displayed on a display that has a curved shape, the image appears to the user to be distorted as per FIG. 12B.

Therefore, by taking into account the position and viewpoint position of the display unit 130 (the display) and the shape and so forth of the display unit 130, the information processing apparatus 100 distorts the image, before the same is displayed, in a direction opposite to the direction of distortion by the display unit 130, as per in FIG. 13A. Thus, as per FIG. 13B, when the display unit 130 displays the AR image, the AR image then appears to the user to be planar.

The information processing apparatus 100 according to this modification example also fulfills the role of performing distortion correction when carrying out transformation processing on an original image which has been generated in the frame buffer 124 and performs longitudinal delay compensation in the distortion correction process.

Figure 14A:
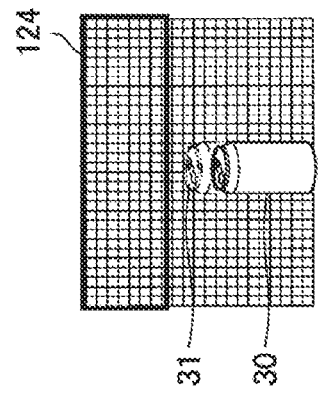
FIGS. 14A, 14B, and 14C are diagrams illustrating delay compensation in a longitudinal direction which is performed in conjunction with distortion correction, according to a modification example of the present disclosure.

More specifically, as illustrated in in FIG. 14A, the image generation unit 123 is assumed to generate an original image 30 in the frame buffer 124. Further, in cases where there is a need to modify (that is, modify upward) the display position of the original image 30 to the position of an original image 31 in order to track a change in the position posture and the like of the local device, the image transformation unit 125 adjusts the distortion correction reading position in the frame buffer 124.

Figure 14B:
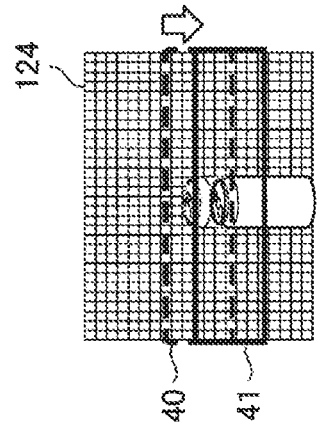
Figure 14C:
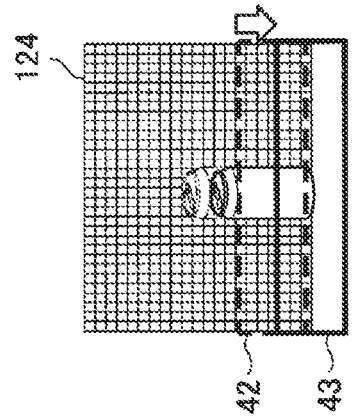

More specifically, as illustrated in FIG. 14B, the image transformation unit 125 modifies (that is, modifies downward) a reading position 40 to a reading position 41. Furthermore, likewise in 14C, the image transformation unit 125 modifies a reading position 42 to a reading position 43. Thus, the information processing apparatus 100 is capable of modifying upward the display position of an AR image. Note that the information processing apparatus 100 is also capable of using a similar method to handle downward delay compensation (in downward delay compensation, the distortion correction reading position is modified upward).

As a result of the foregoing processing, the information processing apparatus 100 is capable of performing longitudinal delay compensation more suitably, and by performing the delay compensation in conjunction with distortion correction, is capable of implementing more efficient processing.

Here, when the foregoing processing is performed, the continuity of the AR image is sometimes lost at the boundaries between the respective slices. More specifically, as a result of longitudinal delay compensation being performed in a certain slice, continuity is sometimes lost between the AR image displayed in this slice and the AR image displayed in the preceding slice.

In this case, the information processing apparatus 100 is capable of handling the foregoing phenomenon by suitably rendering a non-display of a part of an AR image which has been displayed. More specifically, the information processing apparatus 100 renders a non-display of the AR image (or displays an alternative image) of a part where continuity has been lost by controlling each of the optical elements of the display unit 130 (the display).

Note that there are no particular limitations on the method for rendering a non-display of the AR image. For example, the information processing apparatus 100 may thoroughly render a non-display of parts (in the vicinity of slice boundaries) in which continuity has been lost but which are easily recognized by the user. Furthermore, in cases where it is difficult to be recognized by the user that continuity has been lost or where even low quality is permitted, the information processing apparatus 100 need not, as appropriate, render a non-display of an AR image. The foregoing is merely illustrative and may be suitably modified.

Note that the modification example may be applied to either of the foregoing first and second embodiments and may also serve as the modification example described in "5-1. Handling of image loss caused by 2D position correction".

(5-3. Pattern Variations in Original Image Generation and Transformation Processing)

Although an example in which an original image is generated and the original image is subjected to transformation processing has been described hereinabove, this example is merely illustrative and may be suitably modified. Pattern variations in original image generation and transformation processing of original images will be described subsequently.

For example, the information processing apparatus 100 may render, in the frame buffer 124, an original image which has been subjected to delay compensation and may display an AR image in each slice without carrying out transformation processing of the original image.

More specifically, after the position posture estimation unit 121 has estimated the latest position posture and so forth of the local device, the position posture forecasting unit 122 forecasts the position posture and so forth of the local device or of an object in a real space which the user is observing at the time point when the AR image is displayed in each slice (the display start time point or display end time point of each slice, or the like). Then, the image generation unit 123 generates, in the frame buffer 124 and for each slice, an original image which has been subjected to delay compensation, on the basis of the forecasting result corresponding to each slice. The display unit 130 then displays an original image in each slice. Note that various image processing such as distortion correction by the image transformation unit 125 may be suitably performed. In addition, the foregoing processing is merely an example and may be suitably modified.

Furthermore, the original image may be used across a few frames. More specifically, sometimes the AR image display timing is missed because of the corresponding time taken to generate the original image, and during this period a phenomenon where the AR image is temporarily not displayed has been known to occur. Hence, the information processing apparatus 100 is capable of using the original image across a few frames and suitably performing delay compensation by subjecting the original image to transformation processing.

For example, the information processing apparatus 100 re-uses the original image in cases where it is determined that the AR image display timing has been missed due to the corresponding time taken to generate the original image, where the residual battery capacity is less than a predetermined value, where even low quality is permitted, and the like. Thus, the information processing apparatus 100 is capable of avoiding a phenomenon where an image is temporarily not displayed, as mentioned above, and of reducing the power consumption required to generate an original image.

As outlined hereinabove, the information processing apparatus 100 is capable of handling various pattern variations in original image generation and transformation processing of original images.

6. HARDWARE CONFIGURATION

Embodiments of the present disclosure have been described hereinabove. The foregoing processing such as the delay compensation is realized by means of collaboration between hardware that will be described hereinbelow and software.

Figure 15:
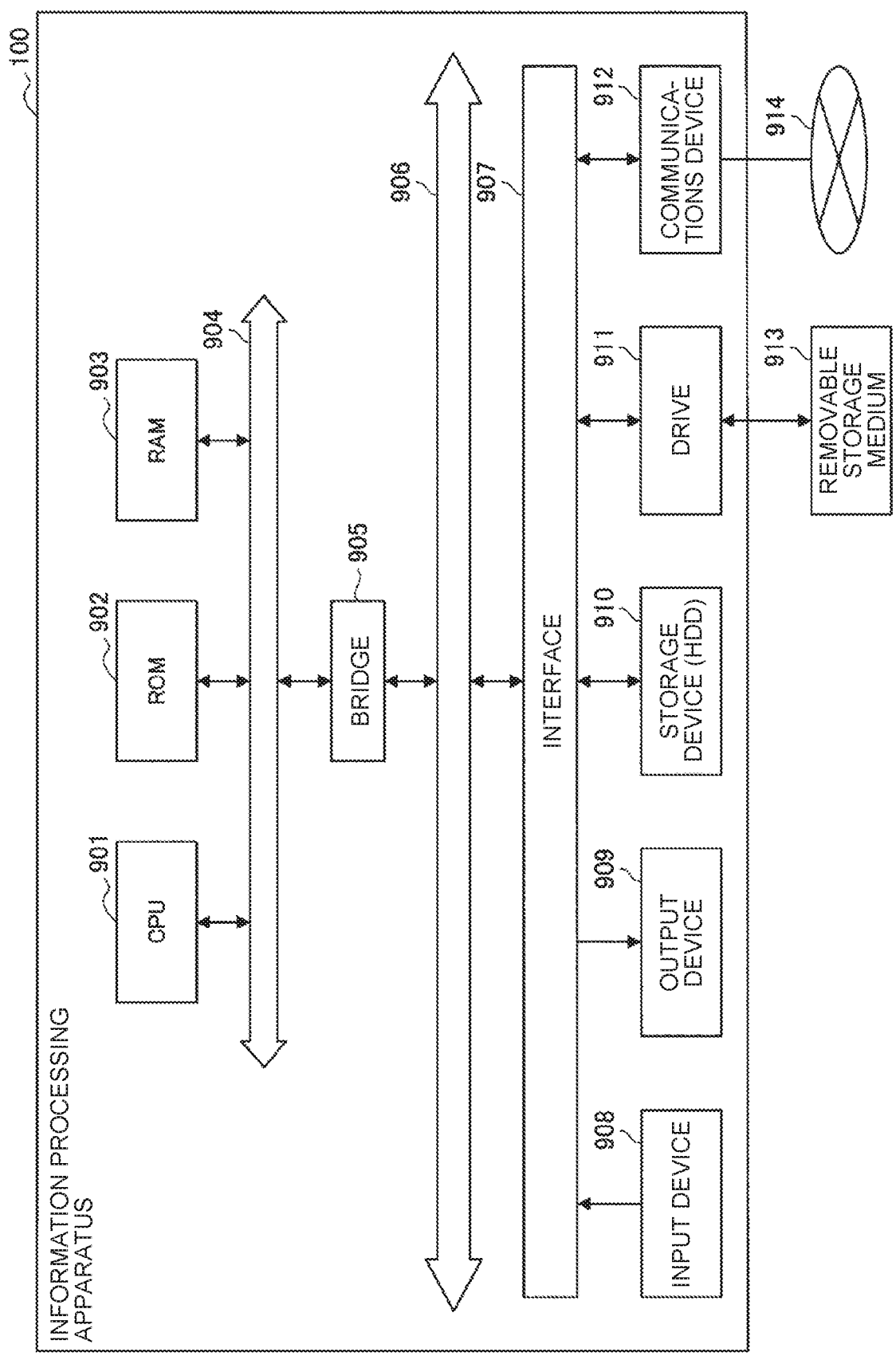
FIG. 15 is a block diagram illustrating an example of a hardware configuration of the information processing apparatus.

FIG. 15 is a diagram illustrating a hardware configuration of the information processing apparatus 100 according to the present disclosure. The information processing apparatus 100 comprises a central processing unit (CPU) 901, a read only memory (ROM) 902, a random access memory (RAM) 903, a host bus 904, a bridge 905, an external bus 906, an interface 907, an input device 908, an output device 909, a storage device (HDD) 910, a drive 911, and a communications device 912.

The CPU 901 functions as an arithmetic processing unit and a control device and controls the overall internal operations of the information processing apparatus 100 in accordance with various programs. The CPU 901 may also be a microprocessor. The ROM 902 stores programs, arithmetic parameters, and the like, which are used by the CPU 901. The RAM 903 temporarily stores the programs used in the execution of the CPU 901 and the parameters that suitably vary in this execution, and the like. The foregoing components are interconnected by the host bus 904, which is configured from a CPU bus or the like. The respective functions of the sensor unit 110 and control unit 120 are realized by way of collaboration between the CPU 901, the ROM 902, and the RAM 903.

The host bus 904 is connected to the external bus 906, which is a peripheral component interconnect/interface (PCI) bus, or the like, via the bridge 905. Note that the host bus 904, bridge 905, and external bus 906 are not necessarily configured separately and that these functions may be implemented by one bus.

The input device 908 is configured from input means whereby a user inputs information, such as a mouse, a keyboard, a touch panel, a button, a microphone, a switch, and a lever, and an input control circuit that generates an input signal on the basis of inputs by the user and that outputs the input signal to the CPU 901, and the like. By manipulating the input device 908, the user using the information processing apparatus 100 is able to input various data to each device and instruct processing operations.

The output device 909 includes, for example, display devices such as a cathode ray tube (CRT) display device, a liquid crystal display (LCD) device, or an organic light emitting diode (OLED) device, and a lamp. In addition, the output device 909 includes speech output devices such as a loudspeaker and headphones. The output device 909 outputs played back content, for example. Specifically, the display device uses text or images to display various information such as video data that is played back. Meanwhile, the speech output device converts the played back speech data and the like to speech and outputs the same. The functions of the display unit 130 are realized by the output device 909.

The storage device 910 is a device for data storage that is configured as an example of the storage unit (not illustrated) of the information processing apparatus 100. The storage device 910 may include a storage medium, a recording device for recording data on the storage medium, a reading device for reading data from the storage medium, and a deletion device for deleting data recorded on the storage medium, or the like. The storage device 910 is configured from a hard disk drive (HDD), for example. The storage device 910 drives the hard disk and stores programs and various data which are executed by the CPU 901.

The drive 911 is a reader/writer for the storage medium and is installed in or externally attached to the information processing apparatus 100. The drive 911 reads information that is recorded on a removable storage medium 913 such as a mounted magnetic disk, optical disk, magneto-optical disk, or semiconductor memory, and outputs the information to the RAM 903. Furthermore, the drive 911 is also capable of writing information to the removable storage medium 913.

The communications device 912 is a communication interface that is configured from a communications device, or the like, for connecting to a communications network 914, for example.

7. CONCLUSION

As has been described hereinabove, the information processing apparatus 100 according to the present disclosure is capable of suitably handling movements of a user or an object in a real space by controlling AR image-related processing for each slice and performing delay compensation. Thus, the information processing apparatus 100 is capable of reducing the displacement in the superimposed position and the display delay which are experienced by the user.

Furthermore, in the information processing apparatus 100 according to the second embodiment, transformation amounts are given continuous values within slices and the transformation amounts are made substantially the same at the boundaries between adjacent slices. Thus, the information processing apparatus 100 is capable of further reducing the displacement in the superimposed position and the display delay which are experienced by the user and is capable of reducing flicker in the AR image caused by tearing.

Furthermore, the information processing apparatus 100 according to the modification example is capable of preventing image loss using 2D position correction by configuring a wider surface area in the frame buffer 124 than for the display constituting the display unit 130. In addition, the information processing apparatus 100 according to an alternative modification example is capable of more suitably handling movements in a longitudinal direction by performing longitudinal delay compensation at the time of distortion correction. Further, the information processing apparatus 100 according to an alternative modification example is capable of handling various processing formats such as omitting the transformation processing by the image transformation unit 125 by generating, in the frame buffer 124, an original image which has been subjected to delay compensation.

Preferred embodiments of the present disclosure have been described in detail hereinabove with reference to the accompanying drawings, but the technical scope of the present disclosure is not limited to such examples. It is obvious that a person ordinarily skilled in the technical field of the present disclosure could arrive at various modification examples or revised examples within the scope of the technological ideas described in the claims, and it is naturally understood that such examples belong to the technical scope of the present disclosure.

For example, each of the steps illustrated in each of the foregoing sequence diagrams need not necessarily be chronologically processed in the order of appearance outlined as the sequence diagram. In other words, each of the steps may suitably be processed in an order that is different from the order outlined as the sequence diagram and may also be processed in parallel.

Furthermore, the function configuration of the information processing apparatus 100 may be suitably provided in an external device. For example, the sensor unit 110 or display unit 130 may be provided in an external device. Further, some of the functions of the devices may be embodied by the control unit 120. For example, some of the functions of the sensor unit 110 or the display unit 130 may be embodied by the control unit 120.

Furthermore, the advantageous effects described in the present specification are only descriptive or exemplary, and non-limiting. In other words, the technology according to the present disclosure affords, in addition to or instead of the foregoing advantageous effects, other advantageous effects which are obvious to a person skilled in the art from the descriptions of the present specification.

Note that the following configurations also fall within the technical scope of the present disclosure.

(1)

An information processing apparatus, comprising:

a control unit that controls a display device to display a first image in a first display region and a second display region, respectively, which are adjacent to each other and have mutually different display timing, so that the first image is superimposed over a real space as seen by a user of the display device, and that controls the display device to transform the first image in the first display region and the first image in the second display region on a basis of changes in position posture information relating to the display device.

(2)

The information processing apparatus according to (1), wherein an image of a single object is displayed using the first image in the first display region and the first image in the second display region.

(3)

The information processing apparatus according to (2), wherein the single object image is divided into the first image in the first display region and the first image in the second display region.

(4)

The information processing apparatus according to (2) or (3), wherein the position posture information includes forecasting information relating to forecasting results of the position posture of the display device, and the control unit controls the display device to transform the first image in the first display region and the first image in the second display region on a basis of the forecasting information.

(5)

The information processing apparatus according to any one of (1) to (4), wherein the position posture information includes first position posture information, second position posture information, and third position posture information, the first position posture information is information which is acquired at a first time point, the second position posture information is information which is acquired at a second time point after the first time point, and the third position posture information is information which is acquired at a third time point after the second time point, and the control unit controls the display device to display the first image which is obtained by transforming a second image acquired on a basis of the first position posture information, on a basis of the second position posture information and the third position posture information.

(6)

The information processing apparatus according to (5), wherein the control unit controls the display device to substantially maintain continuity between the first image in the first display region which is obtained by transforming part of the second image on the basis of the second position posture information, and the first image in the second display region which is obtained by transforming part of the second image on a basis of the third position posture information.

(7)

The information processing apparatus according to (6), wherein the control unit controls, on the basis of the second position posture information and the third position posture information, a first transformation amount of the second image which corresponds to the first display region and a second transformation amount of the second image which corresponds to the second display region.

(8)

The information processing apparatus according to (7), wherein the control unit renders the first transformation amount and the second transformation amount at a boundary between the first display region and the second display region substantially the same.

(9)

The information processing apparatus according to any one of (5) to (8), wherein the control unit generates the second image in a frame buffer on the basis of the first position posture information and controls the display device to display the first image which is obtained by transforming, on the basis of the second position posture information and the third position posture information, the second image generated in the frame buffer.

(10)

The information processing apparatus according to any one of (5) to (9), wherein the control unit generates the second image in a frame buffer that has a larger region than a whole display region of the display device which includes the first display region and the second display region.

(11)

The information processing apparatus according to any one of (1) to (10), wherein a boundary between the first display region and the second display region is provided substantially parallel to a scanning direction of a raster scan.

(12)

The information processing apparatus according to (11), wherein in distortion correction of the first image according to a shape of the display device, the control unit controls the display device to substantially maintain continuity between the first image in the first display region and the first image in the second display region on a basis of changes in the position posture information in a direction perpendicular to the scanning direction.

(13) The information processing apparatus according to (12), wherein when the control unit controls the display device to display the second display region after the first display region, the control unit substantially maintains the continuity by rendering a non-display of at least part of the first image which is displayed in the first display region.

(14) The information processing apparatus according to any one of (1) to (13), wherein the information processing apparatus is an optically transmissive head-mounted display.

(15) An information processing method executed by a computer, comprising:

controlling a display device to display a first image in a first display region and a second display region, respectively, which are adjacent to each other and have mutually different display timing, so that the first image is superimposed over a real space as seen by a user of the display device; and controlling the display device to transform the first image in the first display region and the first image in the second display region on a basis of changes in position posture information relating to the display device.

(16) A program for causing a computer to realize:

controlling a display device to display a first image in a first display region and a second display region, respectively, which are adjacent to each other and have mutually different display timing, so that the first image is superimposed over a real space as seen by a user of the display device; and controlling the display device to transform the first image in the first display region and the first image in the second display region on a basis of changes in position posture information relating to the display device.

REFERENCE SIGNS LIST

100 Information processing apparatus
110 Sensor unit
120 Control unit
121 Position posture estimation unit
122 Position posture forecasting unit
123 Image generation unit
124 Frame buffer
125 Image transformation unit
130 Display unit

The invention claimed is:

1. An information processing apparatus, comprising:
a control unit configured to:
control a display device to display a first image in a first display region of the display device and a second display region of the display device, respectively, wherein
the first display region is adjacent to the second display region,
a display timing of the first display region is different from a display timing of the second display region,
the first image is superimposed over a real space, and
a boundary between the first display region and the second display region is parallel to a scanning direction of a raster scan; and
control the display device to transform the first image in the first display region and the first image in the second display region based on changes in position posture information associated with the display device, wherein
in distortion correction of the first image based on a shape of the display device, the control unit is further configured to control the display device to maintain continuity between the first image in the first display region and the first image in the second display region based on the changes in the position posture information in a direction perpendicular to the scanning direction.

2. The information processing apparatus according to claim 1, wherein the first image is an image of a single object.

3. The information processing apparatus according to claim 2, wherein the image of the single object is divided into the first display region and the second display region.

4. The information processing apparatus according to claim 2, wherein
the position posture information includes forecasting information associated with forecasting results of position posture of the display device, and
the control unit is further configured to control the display device to transform the first image in the first display region and the first image in the second display region based on the forecasting information.

5. The information processing apparatus according to claim 1, wherein
the position posture information includes first position posture information, second position posture information, and third position posture information,
the first position posture information is information acquired at a first time point,
the second position posture information is information acquired at a second time point after the first time point,
the third position posture information is information acquired at a third time point after the second time point,
the control unit is further configured to control the display device to display the first image based on the second position posture information and the third position posture information,
the first image is obtained based on transformation of a second image, and
the second image is acquired based on the first position posture information.

6. The information processing apparatus according to claim 5, wherein
the first image in the first display region is obtained based on transformation of a first part of the second image,
the transformation of the first part of the second image is based on the second position posture information,
the first image in the second display region is obtained based on transformation of a second part of the second image, and
the transformation of the second part of the second image is based on the third position posture information.

7. The information processing apparatus according to claim 6, wherein the control unit is further configured to control, based on the second position posture information and the third position posture information, a first transformation amount of the second image which corresponds to the first display region and a second transformation amount of the second image which corresponds to the second display region.

8. The information processing apparatus according to claim 7, wherein the control unit is further configured to render the first transformation amount same as the second transformation amount at the boundary between the first display region and the second display region.

9. The information processing apparatus according to claim 5, wherein the control unit is further configured to generate the second image in a frame buffer based on the first position posture information.

10. The information processing apparatus according to claim 5, wherein the control unit is further configured to generate the second image in a frame buffer that has a region larger than a whole display region of the display device which includes the first display region and the second display region.

11. The information processing apparatus according to claim 1, wherein
when the display device is controlled to display the second display region after the first display region, the control unit is further configured to maintain the continuity based on render of a non-display of at least a part of the first image displayed in the first display region.

12. The information processing apparatus according to claim 1, wherein the information processing apparatus is an optically transmissive head-mounted display.

13. An information processing method, comprising:
controlling a display device to display a first image in a first display region of the display device and a second display region of the display device, respectively, wherein
the first display region is adjacent to the second display region,
a display timing of the first display region is different from a display timing of the second display region,
the first image is superimposed over a real space, and
a boundary between the first display region and the second display region is parallel to a scanning direction of a raster scan;
controlling the display device to transform the first image in the first display region and the first image in the second display region based on changes in position posture information associated with the display device; and
in distortion correction of the first image based on a shape of the display device, controlling the display device to maintain continuity between the first image in the first display region and the first image in the second display region based on the changes in the position posture information in a direction perpendicular to the scanning direction.

14. A non-transitory computer-readable medium having stored thereon, computer-executable instructions which, when executed by a computer, cause the computer to execute operations, the operations comprising:
controlling a display device to display a first image in a first display region of the display device and a second display region of the display device, respectively, wherein
the first display region is adjacent to the second display region,
a display timing of the first display region is different from a display timing of the second display region,
the first image is superimposed over a real space, and
a boundary between the first display region and the second display region is parallel to a scanning direction of a raster scan;
controlling the display device to transform the first image in the first display region and the first image in the second display region based on changes in position posture information associated with the display device; and
in distortion correction of the first image based on a shape of the display device, controlling the display device to maintain continuity between the first image in the first display region and the first image in the second display region based on the changes in the position posture information in a direction perpendicular to the scanning direction.

* * * * *